US 6,524,043 B2

(12) United States Patent
Earle et al.

(10) Patent No.: US 6,524,043 B2
(45) Date of Patent: Feb. 25, 2003

(54) ADJUSTABLE CARGO GATE SYSTEM

(76) Inventors: Stephen D. Earle, 390 Hidden Pine Cir., Casselberry, FL (US) 32707; Floyd Jacobs, 590 Lake Kathryn Cir., Casselberry, FL (US) 32707

(*) Notice: Subject to any disclaimer, the term of this patent is extended or adjusted under 35 U.S.C. 154(b) by 23 days.

(21) Appl. No.: 09/919,220

(22) Filed: Aug. 1, 2001

(65) Prior Publication Data

US 2002/0090276 A1 Jul. 11, 2002

Related U.S. Application Data

(60) Provisional application No. 60/260,451, filed on Jan. 10, 2001.

(51) Int. Cl.$^7$ .................................................. B60P 7/14
(52) U.S. Cl. ..................... 410/130; 410/121; 410/129; 410/153; 410/135; 410/145; 410/94
(58) Field of Search ................................. 410/121, 129, 410/153, 130, 135, 140, 145, 150, 94; 224/42.33, 42.34; 296/24.1; 220/529, 530, 534, 531, 532, 533, 549, 550

(56) References Cited

U.S. PATENT DOCUMENTS

| 969,002 A | | 8/1910 | Teachout ..................... 410/151 |
| 1,840,927 A | | 1/1932 | Woodruff ..................... 410/143 |
| 3,193,122 A | * | 7/1965 | Sauthoff ..................... 410/40 |
| 4,068,886 A | | 1/1978 | Gostomeki |
| 4,278,376 A | * | 7/1981 | Hunter ..................... 410/130 |
| 4,659,136 A | | 4/1987 | Martin |
| 4,695,211 A | * | 9/1987 | Van Iperen et al. ........... 410/77 |
| 4,717,298 A | * | 1/1988 | Bott ..................... 410/129 |
| 4,737,056 A | | 4/1988 | Hunt ..................... 410/151 |
| 4,834,599 A | | 5/1989 | Gordon ..................... 410/151 |
| 5,167,479 A | * | 12/1992 | Bott ..................... 410/121 |
| 5,586,850 A | * | 12/1996 | Johnson ..................... 410/138 |
| 5,975,819 A | * | 11/1999 | Cola ..................... 410/129 |
| 6,099,220 A | * | 8/2000 | Poth ..................... 410/94 |
| 6,109,847 A | * | 8/2000 | Patel et al. ................. 410/129 |
| 6,261,038 B1 | * | 7/2001 | Cowan ..................... 410/94 |

* cited by examiner

Primary Examiner—Stephen T. Gordon

(57) ABSTRACT

An adjustable cargo gate system for a flat bed of a truck or trailer is provided for restraining objects, including small items, from sliding or moving about when the vehicle accelerates, decelerate, or makes sharp turns. It consists of a grate of adjustable width supported in a vertical position by braces attached to cars sliding on a pair of tracks extending from front to rear on the bed or floor of the vehicle. The grate can be positioned at any point athwart the bed of the vehicle, including diagonally across it. The bars of the grate provide anchoring for tie-downs to secure items that are too large to fit within the vehicle bed, or small items that might escape through the openings in the grate.

4 Claims, 4 Drawing Sheets

ADJUSTABLE CARGO GATE SYSTEM

Applicant of this formal utility application claims the benefit of a previously filed provisional application, Serial No. 60/260451, filed Jan. 10, 2001.

TECHNICAL FIELD

The present invention relates to apparatus and methods for bracing cargo in a container for transport. More particularly, the present invention pertains to apparatus and methods for securing cargo in a vehicle, such as the cargo bed of a truck or trailer.

BACKGROUND OF THE INVENTION

When cargo is loaded into a truck or trailer but does not entirely fill the cargo space, it needs bracing to prevent it from shifting about and being damaged when the vehicle is in motion, and particularly when the vehicle makes a sharp turn, accelerates, or comes to an abrupt stop. There is a need to provide bracing apparatus that will accommodate the myriad of items that people haul in trucks or trailers: rectangular boxes, cylindrical articles such as barrels and drums, lumber, furniture, appliances, mattresses, machines, household goods, tools, equipment, yard waste and the like. If items are stacked on top of other items, it may be difficult to secure them.

A number of adjustable length bracing devices are known and disclosed in the prior art. The majority of these are telescoping. For instance, U.S. Pat. No. 4,343,578 to Barnes is for a load stabilizer for a truck which comprises horizontal telescoping poles biased against the sidewalls of a truck bed.

U.S. Pat. No. 4,737,056 to Hunt discloses another telescoping pole brace with mounting brackets that pivot on the ends of the brace so that it may be mounted at various angles with the side walls. It also provides a T-connector and second pole perpendicular to the first pole which can be biased against another wall or against the floor of the transport container.

U.S. Pat. No. 4,834,599 to Gordon is for yet another pole-like device of adjustable length having two arms extending from a connecting sleeve. Its mounting brackets are suction cups which engage opposing side walls of a truck.

A load-retaining attachment for freight cars is disclosed in U.S. Pat. No. 969,002 to Teachout. The device is a telescoping beam that attaches to the side walls of the freightcar by means of sharpened spurs at each end thereof which penetrate the walls.

U.S. Pat. No. 1,840,927 to Woodruf is for an adjustable bar of a pair of bar sections aligned end to end, the outer ends of the bar having hooks to engage the upper rimedges of the sides walls of a freight car, and the inner ends terminating in threaded rods coupled by a turnbuckle.

These telescoping bar or pole devices are useful for restraining a single layer of boxes or other items but are not capable of restraining multiple layers of thin items such as a mattress or a stack of lumber or other narrow items.

U.S. Pat. No. 4,659,136 discloses a collapsible extendable enclosure structure for covering the open bed of a land or marine vehicle. The structure includes an end gate assembly selectively positionable and releasably securable at various locations on the truck bed, independently of the movable rear section of the enclosure. A system of cables and sheaves directs the force needed to retract or extend the structure by sliding its sections along tracks mounted at the top edges of the side walls of the vehicle. This invention is extremely complicated in structure and deployment, and the end gate assembly, being part of an enclosure, is solid, making it heavier than is needed for a simple restraint.

Accordingly there is a need for an uncomplicated, adjustable cargo restraint that is adaptable to a variety of loads, including loads of stacked small loose items, and that is lightweight and easy to position. Additionally it should provide tie-down capability for items that might otherwise slide around or off the truck bed.

SUMMARY OF THE INVENTION

A primary object of the present invention is to provide an adjustable cargo gate system for a bed or floor of a pick-up truck or trailer for restraining objects being transported from sliding or moving when the vehicle accelerates, decelerate, or makes sharp turns.

Another object of the invention is to provide a cargo restraint that is lightweight, easy to set up and easy to remove or store flat, and that can be deployed in a variety of positions athwart the bed of the vehicle.

Still another object of the invention is to provide a cargo restraint to which tie-down means can be attached.

Yet another object of the invention is to provide a cargo restraint of adjustable width so that it can be narrowed to fit between wheel wells, and widened to fit diagonally across corners as well as from side to side at the widest dimension.

BRIEF DESCRIPTION OF THE DRAWINGS

FIG. 6 is a cross-sectional detail view of a track and a sliding bracket viewed at 6—6 of FIG. 3.

DETAILED DESCRIPTION OF THE PREFERRED EMBODIMENT

Figure 1:
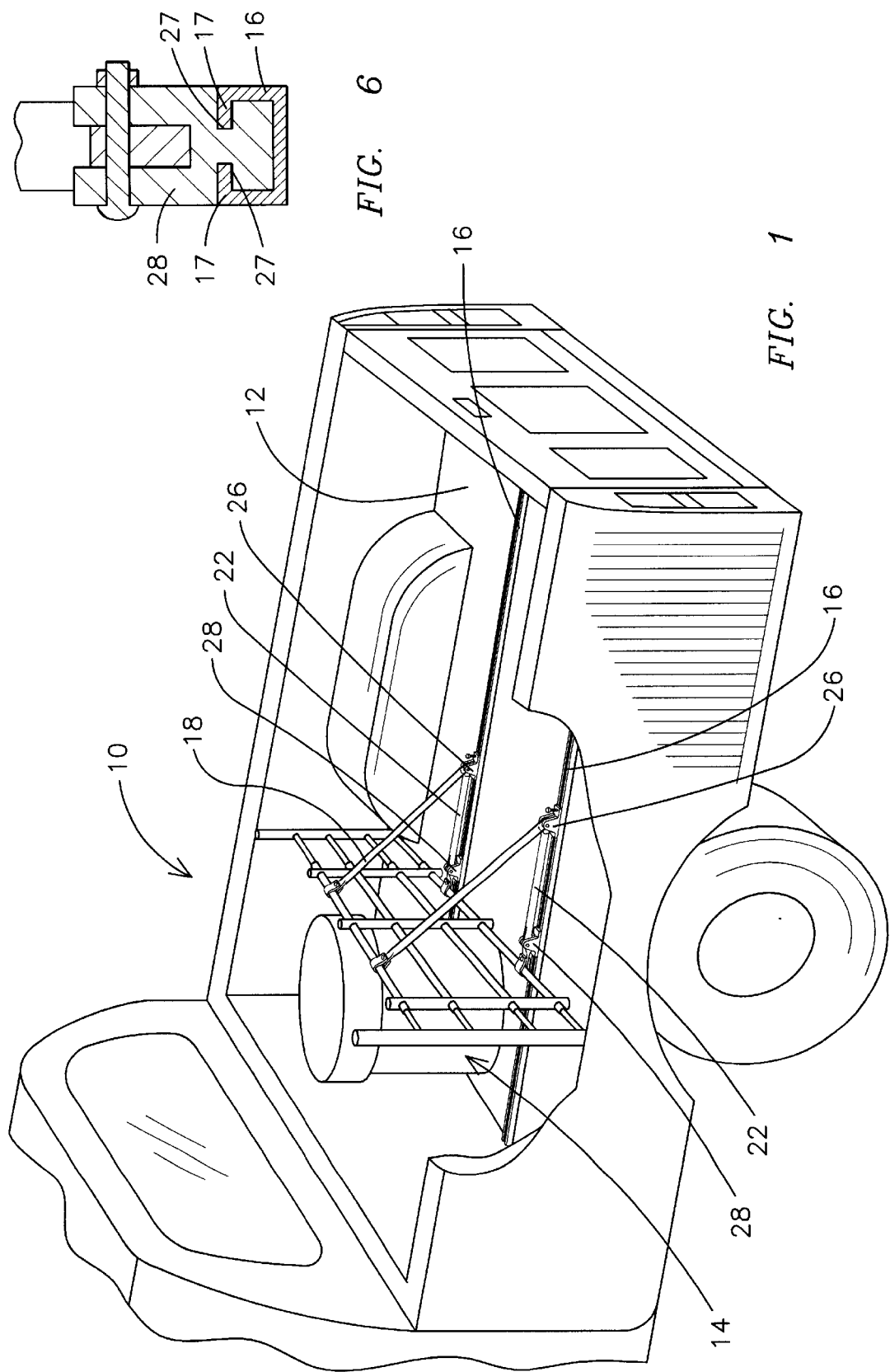
FIG. 1 shows a perspective view of the adjustable cargo gate system installed in a pickup truck.
Figure 2:
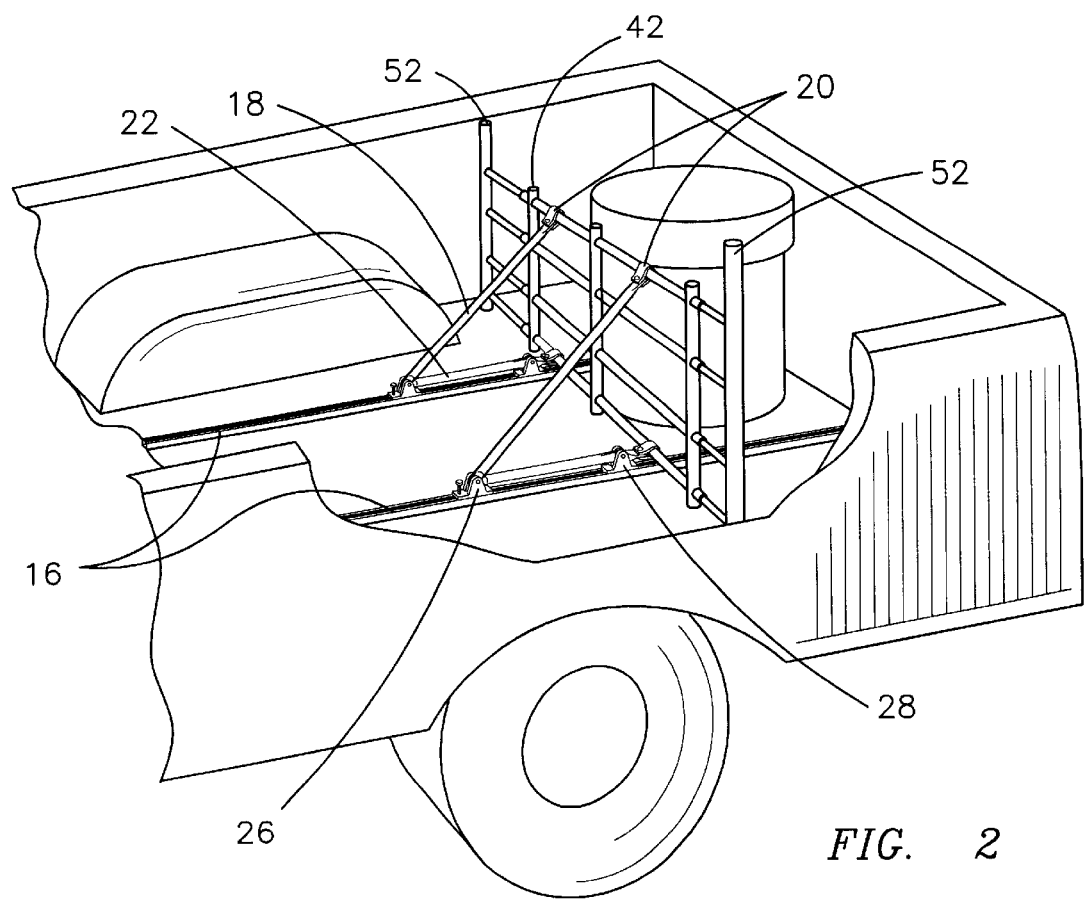
FIG. 2 shows a perspective view of the invention with the cargo gate in a reversed position to that of FIG. 1.

Referring to FIGS. 1 through 6, an adjustable cargo gate system 10 is designed to secure cargo from sliding around the bed 12 of a pickup truck, or falling over and rolling about, when the truck is accelerating, decelerating or turning. The gate member 14, which is more particularly described below, slides forward or aft on a pair of parallel tracks 16 spaced apart lengthwise and affixed to the truck bed 12, thereby permitting the system to adapt to varying sizes of loads to be secured. Tracks 16 are conventional; they define a rectilinear C shape in cross-section, lying on its backside, as in FIG. 6. The vertical legs of the rectilinear C shape are bent toward one another, forming flanges 17. Preferably the tracks are made of aluminum and are available from the Loxcreen Company, Inc., a South Carolina corporation.

Gate member 14 is supported in an upright position by two sets of braces 18 and 22. Each diagonal brace 18 extends between the top of gate member 14 to a first sliding bracket 26 on a track 16, positioned so that it is in the same vertical plane as the track 16 to which it extends. Its proximal end is removably and pivotally attached to the top of gate member 14 by first clamps 20. The distal ends of diagonal braces 18 and the distal ends 23 of horizontal braces 22 are both held by first sliding brackets 26. The proximal ends 24 of horizontal braces 22 are attached to second sliding brackets 28 positioned on their associated respective tracks 16, which in turn are pivotally attached to the bottom of gate member 14 with second clamps 29. The sliding brackets 26 and 28 function as cars with slots 27 on either side thereof for mating with flanges 17 in conventional fashion, more particularly shown in FIG. 6. First sliding brackets 26 are locked in a selected position on tracks 16 by fasteners 30 such as bolts, as more particularly shown in FIG. 3, which bias sliding brackets 26 against the troughs of tracks 16.

When gate member 14 is upright, athwart its truck bed 12, and sliding brackets 26 are locked in any desired position along tracks 16, a pair of right triangles in parallel vertical planes are defined by imaginary vertical lines dropped from first clamps 20 to second clamps 29 (the top to the bottom of gate 14), diagonal braces 18, and horizontal braces 22.

Figure 3:
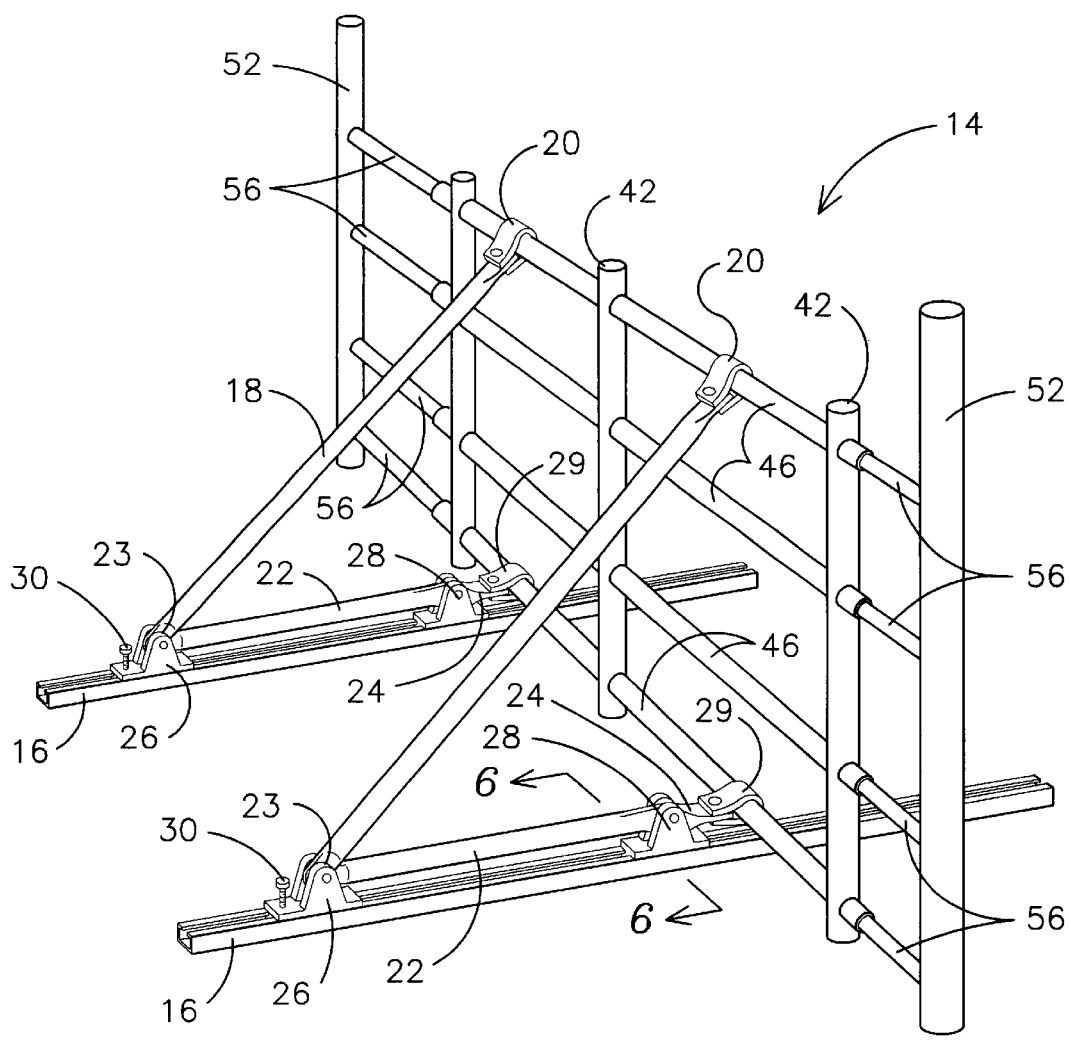
FIG. 3 is a detail perspective view of the invention.
Figure 4:
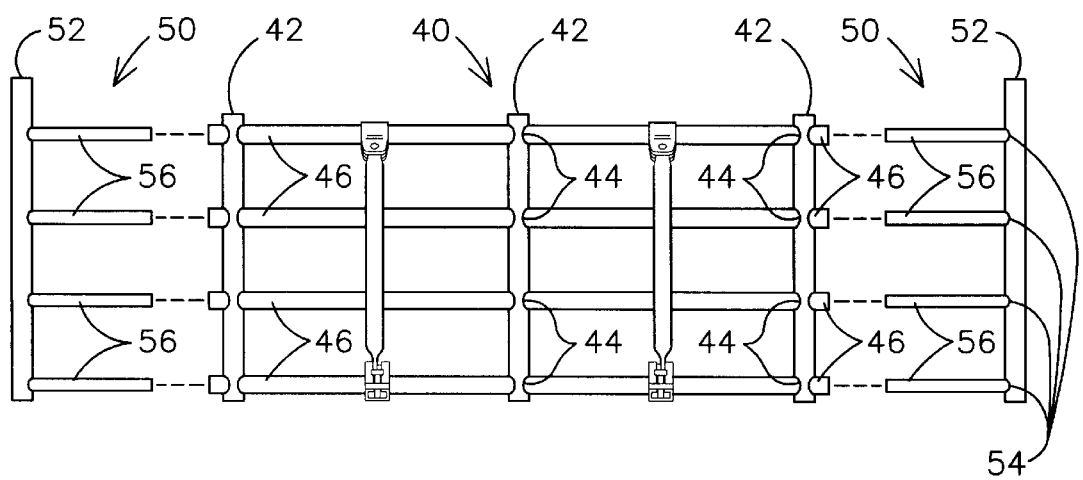
FIG. 4 is an elevational view of the side of the gate to which its braces are attached.

Referring now to FIG. 4, gate member 14 is essentially a grating in three telescoping sections: a center section 40, and two end sections 50 which are mirror images of each other. Center section 40 has at least two identical vertical tubular bars 42, having parallel horizontal bores 44 milled through the sides thereof, through which horizontal tubular bars 46 are threaded. Optimally there should be at least three vertical bars 42, as shown in FIGS. 1–5, to provide greater rigidity of the grate. The assembled center section 40 should be welded at each junction of vertical bars 42 and horizontal bars 46, with the exception that rivets may be used at junctions where they will not protrude through the inner diameter of the tubing to interfere with telescoping engagement of end sections 50 with center section 40. The preferred embodiment is constructed of tubular aluminum, but it could be made of other strong rigid tubular material.

End sections 50 are each comprised of a vertical end bar 52 having bores 54 milled through the sides thereof, spaced apart at intervals corresponding to the intervals between bores 44 in vertical bars 42 of center section 40. A plurality of horizontal end bars 56 are threaded through bores 54 and fastened in place with any conventional fastener such as rivets. Horizontal end bars 56 have an external diameter of a size selected for unimpeded sliding movement into the ends of horizontal hollow bars 46.

As shown more particularly in FIG. 3, first and second clamps 20 and 29 attach to the uppermost and lowermost horizontal bars 46 of center section 40.

Figure 5:
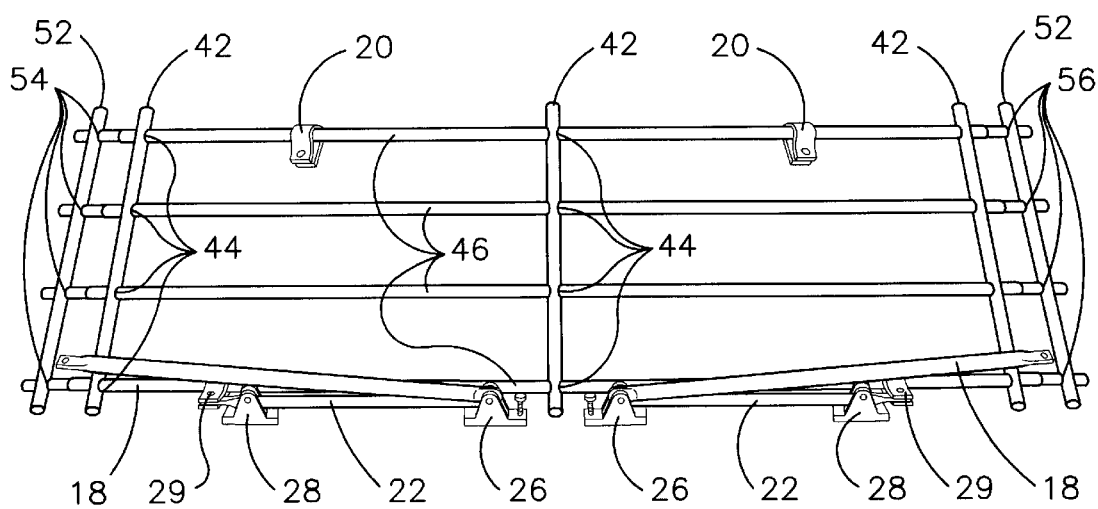
FIG. 5 is a perspective view of the collapsed gate removed from its tracks for storage when not in use.

The telescoping feature of gate member 14 allows the width of it to be adjusted for different widths of truck beds, as well as the narrowing of a truck bed at the rear wheel wells. When the proximal ends of diagonal braces 18 are unclamped from the uppermost horizontal bars 46, the entire assembly can be collapsed, as shown in FIG. 5. To store it in the position indicated in FIG. 5, sliding brackets 26 and 28 must be removed from engagement with tracks 16.

Figure 7:
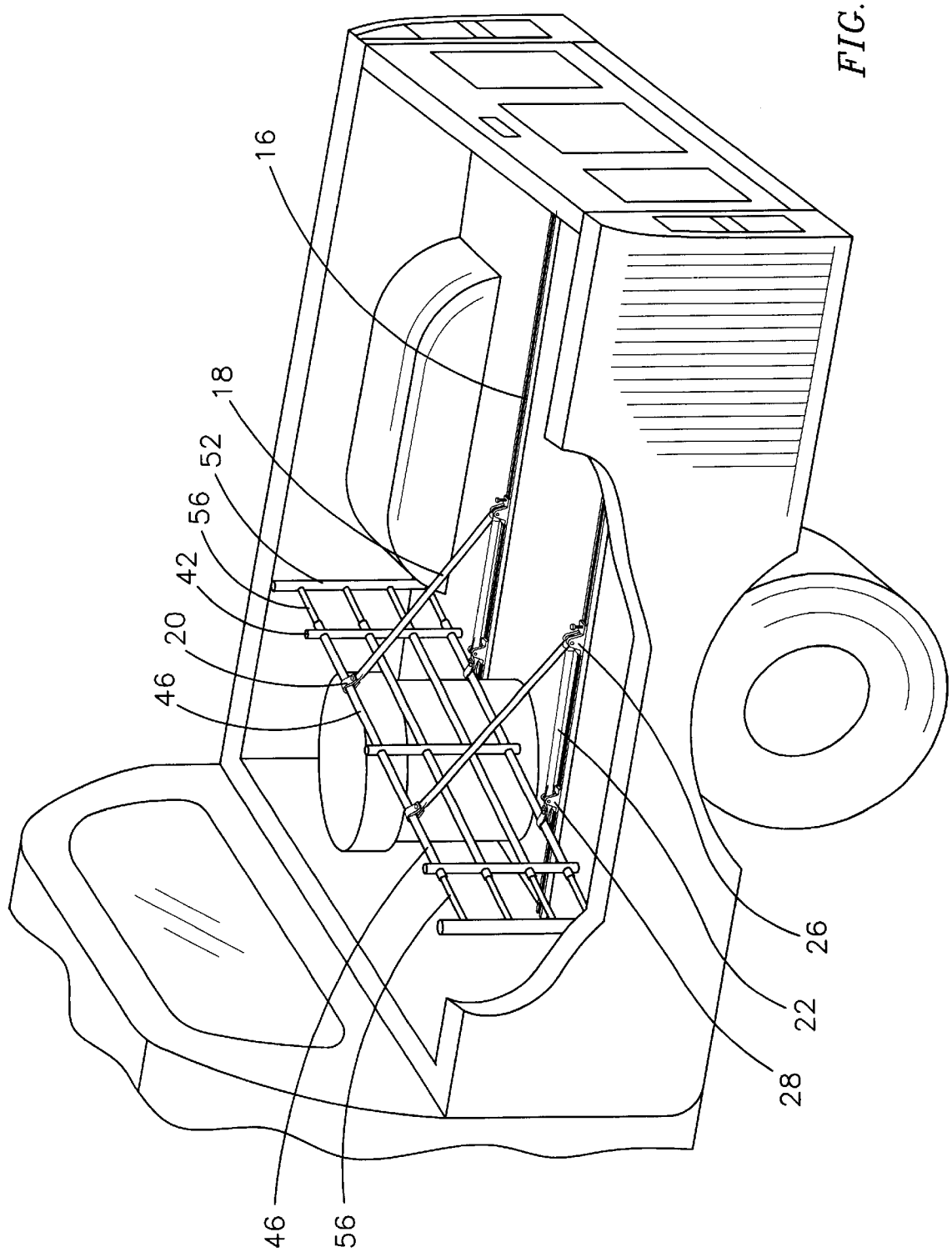
FIG. 7 is a perspective view of the gate of this invention angled to brace a load in a corner of a truck bed.

FIG. 7 illustrates that the position of gate member 14 athwart the vehicle bed need not be perpendicular to the sides, but can be set at approximately fifteen degrees from the perpendicular so as to brace a cargo item into a corner of the vehicle bed, so that it cannot slide from side to side.

It will be appreciated that numerous adaptations and modifications can be made to the embodiments disclosed herein without departing from the spirit and scope of the invention. As such, those skilled in the art will recognize that the conception on which this invention is based can be utilized to design other devices and systems for related tasks. It is important, therefore, that the claims be viewed as including equivalent constructions that do not depart from the spirit and scope of the present invention.

What is claimed is:

1. An adjustable cargo gate system for restraining cargo on an open bed of a vehicle, the open bed having longitudinally spaced apart forward and rearward ends and spaced apart sides, said system comprising:

track members removably secured to said vehicle bed and disposed parallel to said vehicle sides;

a removable gate member disposed perpendicular to said track members and to said vehicle sides, said gate member comprised of a latticework of horizontal and vertical rails;

bracing means removably and pivotally attachable to said latticework for supporting said gate member in an upright position;

sliding car members engageable with said track members, said car members being pivotally and removably attached to said bracing means;

locking means for securing each said car member at a selected point on one of said track members;

whereby said gate member can be slid forward or rearward along said track members and temporarily locked at any selected point in an upright position to restrain movement of cargo on the open vehicle bed, or pivoted to lie flat on said vehicle bed when not needed.

2. The system according to claim 1 wherein said latticework of said gate member has telescoping sections whereby said gate member can be widened or narrowed to span varying widths of a vehicle bed.

3. The system according to claim 1 wherein said bracing means is comprised of assemblies of a horizontal bar and a diagonal bar, each said bar having a distal end and a proximal end, said horizontal bar and said diagonal bar being pivotally connected to each other at their respective distal ends and to a first said car member, each corresponding proximal end of said horizontal bar being pivotally connected to a lower rail of said lattice work and to a second said car member on the same track member engaging said first car member, each corresponding proximal end of said diagonal bar member being connected to an upper rail of said latticework.

4. An adjustable cargo gate system for restraining cargo on an open bed of a vehicle, the open bed having longitudinally spaced apart forward and rearward ends and spaced apart sides, said system comprising:

track members removably secured to said vehicle bed and disposed parallel to said vehicle sides;

a removable gate member disposed perpendicular to said track members and to said vehicle sides, said gate member comprised of a latticework of horizontal and vertical rails, said latticework having telescoping sections whereby said gate member can be widened or narrowed to span varying widths of the vehicle bed;

bracing means removably and pivotally attachable to said latticework for supporting said gate member in an upright position, said means being comprised of assemblies, each assembly having a horizontal bar and a diagonal bar, each said bar having a distal end and a proximal end, said horizontal bar and said diagonal bar being pivotally connected to each other at their respective distal ends and to a first sliding car member engaged with one of said track members, each corresponding proximal end of said horizontal bar being pivotably connected to a lower rail of said lattice work and to a second sliding car member on the same track member engaging said first car member, each corresponding proximal end of said diagonal bar member being connected to an upper rail of said latticework; and, locking means for securing each said car member at a selected point on one of said track members;

whereby said gate member can be slid forward or rearward along said track members and temporarily locked at any selected point in an upright position to restrain movement of cargo on the open vehicle bed, or pivoted to lie flat on said vehicle bed when not needed.

\* \* \* \* \*